(12) United States Patent
Semenov

(10) Patent No.: US 12,158,900 B2
(45) Date of Patent: Dec. 3, 2024

(54) EXTRACTING INFORMATION FROM DOCUMENTS USING AUTOMATIC MARKUP BASED ON HISTORICAL DATA

(71) Applicant: ABBYY Development Inc., Dover, DE (US)

(72) Inventor: Stanislav Semenov, Moscow (RU)

(73) Assignee: ABBYY Development Inc., Dover, DE (US)

( * ) Notice: Subject to any disclaimer, the term of this patent is extended or adjusted under 35 U.S.C. 154(b) by 0 days.

(21) Appl. No.: 17/976,439

(22) Filed: Oct. 28, 2022

(65) Prior Publication Data

US 2024/0143632 A1 May 2, 2024

(51) Int. Cl.
*G06F 16/00* (2019.01)
*G06F 16/215* (2019.01)
(Continued)

(52) U.S. Cl.
CPC .......... *G06F 16/288* (2019.01); *G06F 16/215* (2019.01); *G06F 16/24578* (2019.01);
(Continued)

(58) Field of Classification Search
CPC ........ G06F 16/288; G06F 16/94; G06F 16/38; G06F 16/215; G06F 16/335;
(Continued)

(56) References Cited

U.S. PATENT DOCUMENTS 7,069,256 B1 * 6/2006 Campos .............. G06F 16/2457
706/16
8,001,139 B2 * 8/2011 Slaney ................ G06F 16/5866
707/765

(Continued)

FOREIGN PATENT DOCUMENTS

WO WO2005098601 A2 * 10/2005
WO WO 2019129775 A1 * 7/2019
(Continued)

OTHER PUBLICATIONS

Bavan, A.S, "An artificial neural network that recognizes an ordered set of words in text mining task", 2009 International Conference on the Current Trends in Information Technology (CTIT) (pp. 1-5).*

(Continued)

*Primary Examiner* — Srirama Channavajjala
(74) *Attorney, Agent, or Firm* — Lowenstein Sandler LLP

(57) ABSTRACT

Mechanisms for document processing and analysis can include receiving a document and identifying, in a data structure, a record corresponding to the document. The record can include one or more entries, where each entry contains data reflecting a respective item of information extracted from a corresponding part of the document. The mechanisms can include determining for each entry of the record, a corresponding degree of association between the entry and a respective item of information referenced by the entry. They can further include updating the corresponding degrees of association, and selecting, among the corresponding degrees of association, a set of corresponding degrees of association whose aggregate degree of association satisfies a criterion.

12 Claims, 7 Drawing Sheets

(51) Int. Cl.
*G06F 16/2457* (2019.01)
*G06F 16/248* (2019.01)
*G06F 16/28* (2019.01)
*G06F 16/335* (2019.01)
*G06F 16/38* (2019.01)
*G06F 16/93* (2019.01)
*G06N 3/08* (2023.01)
*G06N 3/082* (2023.01)
*G06N 5/046* (2023.01)
*G06N 20/00* (2019.01)

(52) U.S. Cl.
CPC .......... *G06F 16/248* (2019.01); *G06F 16/285* (2019.01); *G06F 16/335* (2019.01); *G06F 16/38* (2019.01); *G06F 16/94* (2019.01); *G06N 3/08* (2013.01); *G06N 3/082* (2013.01); *G06N 5/046* (2013.01); *G06N 20/00* (2019.01)

(58) Field of Classification Search
CPC .............. G06F 16/24578; G06F 16/248; G06F 16/285; G06F 17/30011; G06F 17/30247; G06F 17/30286; G06N 3/08; G06N 3/082; G06N 5/046; G06N 5/047; G06N 20/00
See application file for complete search history.

(56) References Cited

U.S. PATENT DOCUMENTS

| | | | | |
|---|---|---|---|---|
| 8,473,501 | B2* | 6/2013 | Weber | G06F 16/90344 |
| | | | | 707/769 |
| 8,805,808 | B2* | 8/2014 | Transier | G06F 16/319 |
| | | | | 707/711 |
| 10,061,763 | B2 | 8/2018 | Tamilarasan et al. | |
| 10,176,159 | B2 | 1/2019 | Vohra et al. | |
| 10,762,444 | B2* | 9/2020 | Fly | G06N 7/01 |
| 11,036,769 | B1 | 6/2021 | Schultz et al. | |
| 11,797,775 | B1* | 10/2023 | Vinicombe | G06N 7/00 |
| 11,798,301 | B1* | 10/2023 | Rimchala | G06V 30/414 |
| 2003/0069895 | A1* | 4/2003 | Stephens | G06F 16/93 |
| 2004/0015777 | A1* | 1/2004 | Lei | G06F 16/957 |
| | | | | 707/E17.119 |
| 2012/0041955 | A1* | 2/2012 | Regev | G06F 16/355 |
| | | | | 707/E17.089 |
| 2012/0158621 | A1* | 6/2012 | Bennett | G06F 16/334 |
| | | | | 706/12 |
| 2013/0013596 | A1* | 1/2013 | Wang | G06F 16/3322 |
| | | | | 707/728 |
| 2017/0286869 | A1* | 10/2017 | Zarosim | G06N 5/025 |
| 2018/0253496 | A1* | 9/2018 | Natchu | G06F 16/951 |
| 2018/0285459 | A1* | 10/2018 | Soni | G06F 16/93 |
| 2020/0065704 | A1* | 2/2020 | Nag | G06N 5/01 |
| 2020/0184210 | A1* | 6/2020 | Malabarba | G06V 10/426 |
| 2020/0293902 | A1* | 9/2020 | Li | G06N 3/088 |
| 2021/0004580 | A1* | 1/2021 | Sundararaman | G06V 30/224 |
| 2021/0064862 | A1 | 3/2021 | Pati et al. | |
| 2021/0319068 | A1* | 10/2021 | Li | G06N 3/006 |
| 2022/0108073 | A1* | 4/2022 | Menon | G06F 40/295 |
| 2022/0188520 | A1* | 6/2022 | Iso-Sipila | G06F 40/295 |
| 2022/0292123 | A1* | 9/2022 | Hoppe | G06F 16/35 |
| 2023/0161964 | A1* | 5/2023 | Shah | G06F 40/166 |
| | | | | 704/9 |
| 2023/0306071 | A1* | 9/2023 | Magureanu | G06F 18/241 |
| 2024/0020999 | A1* | 1/2024 | Stoicescu | G06V 30/19173 |

FOREIGN PATENT DOCUMENTS

| | | |
|---|---|---|
| WO | WO2021195149 A1 * | 9/2021 |
| WO | WO 2023076754 A1 * | 5/2023 |

OTHER PUBLICATIONS

Shaohua Li et al., "Generative topic embedding: a continuous representation of documents.", Proceedingsofthe54thAnnual MeetingoftheAssociationforComputationalLinguistics, Aug. 2016, pp. 666-675.*

Sattar Seifollahi et al., "An Embedding-Based Topic Model for Document Classification", ACM Transactions on Asian and Low-Resource Language Information Processing vol. 20 Issue 3 Article No. 52 Apr. 2021 pp. 1-13.*

* cited by examiner

EXTRACTING INFORMATION FROM DOCUMENTS USING AUTOMATIC MARKUP BASED ON HISTORICAL DATA

TECHNICAL FIELD

The implementations of the disclosure relate generally to computer systems and, more specifically, to systems and methods for document processing and analysis.

BACKGROUND

Training machine learning models for detecting elements in electronic documents is a foundational task involved in automated processing, storing, and referencing documents. Some approaches for extracting data from historical documents may involve the use of a large number of user labeled documents and may thus require many preliminary time consuming operations.

SUMMARY OF THE DISCLOSURE

Implementations of the present disclosure describe mechanisms for automatically identifying data in historical documents and training machine learning models to extract information based on historical data.

A method of the disclosure includes receiving a document and identifying, in a data structure, a record corresponding to the document. The record can include one or more entries, where each entry contains data reflecting a respective item of information extracted from a corresponding part of the document. The method includes determining for each entry of the record, a corresponding degree of association between the entry and a respective item of information referenced by the entry. The method further includes updating the corresponding degrees of association, and selecting, among the corresponding degrees of association, a set of corresponding degrees of association whose aggregate degree of association satisfies a criterion.

A system of the disclosure includes a memory, and a processor operatively coupled to the memory, the processor configured to receive a document and identify, in a data structure, a record corresponding to the document. The record can include one or more entries, where each entry contains data reflecting a respective item of information extracted from a corresponding part of the document. The processor can further be configured to determine, for each entry of the record, a corresponding degree of association between the entry and a respective item of information referenced by the entry. The processor can also be configured to update the corresponding degrees of association, and select, among the corresponding degrees of association, a set of corresponding degrees of association whose aggregate degree of association satisfies a criterion.

A system of the disclosure can include a memory device including a data structure and a processor coupled to the memory device, the processor configured to perform operations including receiving multiple documents and identifying, in a data structure, a set of multiple records, each record corresponding to one of the multiple documents. Each record can include a plurality of entries, where each entry is associated with a corresponding class of information. The processor can be configured to mark, using the entries of each record, a variety of data fields on each document, where each data field corresponds to a respective class of information, to generate a training set of marked documents. The processor can also be configured to train a machine learning model, using the training set of marked documents, to detect data fields on documents, and to process the documents by using the trained machine learning model to mark data fields on each document. Further, the processor can be configured to compare the data fields marked using the trained machine learning model with the data fields marked using the entries of each record to determine a measure of mark-up accuracy, and to determine whether the measure of markup accuracy satisfies a criterion. The processor can also be configured to process, in response to determining that the measure of markup accuracy satisfies the criterion, one or more new documents using the trained machine learning model.

A non-transitory machine-readable storage medium of the disclosure includes instructions that if executed by a processor causes the processor to perform the functions and operations described above as well as those described in more detail below. The foregoing summary of the present invention with the preferred embodiments should not be construed to limit the scope of the invention. The various embodiments of the invention thus described may be further modified without departing from the spirit and scope of the invention.

BRIEF DESCRIPTION OF THE DRAWINGS

The disclosure will be understood more fully from the detailed description given below and from the accompanying drawings of various implementations of the disclosure. The drawings, however, should not be taken to limit the disclosure to the specific implementations, but are for explanation and understanding only.

DETAILED DESCRIPTION

Figure 1:
FIG. 1 depicts a high level flow diagram of an example method for training a model to extract information from documents using automatic markup based on historical data, in accordance with some implementations of the present disclosure.

Various implementations for training models for document processing and analysis are described. More specifically, implementations disclosed herein relate to training models to extract information from documents using automatic markup based on historical information.

As used herein, documents can include printed or digital items of different types, e.g., invoices, identification documents (IDs), credit applications, bank statements, contracts, multipage documents, bills of lading, tickets, accounting documents, statements, etc. existing in large numbers in physical or digital form. Furthermore, "document" can refer to any discrete item of textual or graphical content that can be represented in digital form (e.g., as a digital image of which may be accessible to a computing system). Accordingly, the term "document image" can refer to an image of such discrete items of textual or graphical content. The digital form of the document (i.e., image) may be a scanned image, a photographed image, or any other visual representation of a document that is capable of being converted into a digital form. Thus the term "document" may refer to a file comprising one or more digital content items that may be visually rendered to provide a visual representation of the electronic document (e.g., on a display or a printed material). In accordance with various implementations of the present disclosure, a document may conform to any suitable electronic file format, such as .pdf, .doc, .odt, .jpeg, tiff, etc. Although the document may be represented in an electronic (e.g., digital) file format, in some cases and the logical or physical structure of the document (e.g., locations of various text fields, tables, etc.) may not be reflected by the digital representation.

A "document" may be represented by a financial document, a legal document, or any other document, e.g., a document that is produced by populating fields with alphanumeric symbols (e.g., letters, words, numerals) or images. "Document" may represent a record of information that is printed, typed, or handwritten (for example, by filling out a standard form). "Document" may represent a form document that has a variety of fields, such as text fields (containing numerals, numbers, letters, words, sentences), graphics field (containing a logo or any other image), tables (having rows, columns, cells), and so on. Examples of different types of documents that have fields include contracts, invoices, financial documents, business cards, personal identification documents, loan applications, order/discharge documents, accounting documents, reporting documents, patent search reports, various company forms, etc.

As used herein, with respect to a document the term "field" may refer to a data area (i.e., a portion) of a document that contains alphanumeric characters. Each field can contain textual (or graphical) content of a particular category. For example, a text field can contain information reflecting a "name," "company name," "telephone," "fax," "address," "vendor name," "type of payment," "method of payment," "type of merchandise," "quantity of merchandise," or any other category of information that can be represented with alphanumeric or graphical elements in a document.

Fields can be found in various types of documents, such as, invoices, financial documents, business cards, personal identification documents, loan applications, etc. The detection of information in fields in a document can be achieved by optical character recognition (OCR) of such a document and may involve a preliminary step of identifying fields contained in the document. Some approaches for processing documents use trainable neural networks or other machine learning techniques to extract information from documents. The neural network can include multiple neurons that are associated with learnable weights and biases. The neurons may be arranged in layers. The neural network may be trained on a training dataset of documents that contain known or marked information in specified areas. For example, the training data set can include examples of documents containing one or more marked fields/areas with identified information as training inputs and one or more field type and/or information class identifiers that correctly correspond to the one or more data items in a reference data set. The neural network may generate an observed output for each training input. The observed output of the neural network may be compared with a training output corresponding to the training input as specified by the training data set, and the error may be propagated back to the previous layers of the neural network, whose parameters (e.g., the weights and biases of the neurons) may be adjusted accordingly. During training of the neural network, the parameters of the neural network may be adjusted to optimize prediction (e.g., information identification/extraction) accuracy.

In several systems these approaches can include the utilization of comparisons of historical data and information contained in various data structures (e.g., databases). Data can be extracted from portions of existing documents where the portions can represent specific fields or areas that contain, for example, textual, graphical, or other information. However, due to discrepancies in data input, formatting, and errors these approaches may not be sufficiently effective in performing comparisons between historical collections of information contained in documents such as sets of specific historical documents (e.g., company bills, invoices, bank statements, business cards, ID cards, credit applications, etc.) and information stored in a data structures (e.g., database). Furthermore, such approaches are also unable to generate automatic markup of documents based on this data comparison and, as a result, such tools are incapable of generating accurate training data for training neural networks to extract information based on automatically generated markup of new unknown documents.

For example, a database can be created on the basis of a collection of existing documents. The information in the documents can be OCRed and extracted. The extracted information can be divided into discrete data items each of which can be input as elements in a data structure. For example the data items (e.g., character strings) can be input as entries in records of a database. In some example, the data structure can be a database that can be automatically populated or populated via used input of information extracted from multiple existing documents. In various examples, the information can be extracted from the documents and entered into the database incorrectly, can be entered into the database selectively and not completely, and/or can be entered using a variety of automated methods. In some cases, such databases could be abandoned or partially lost over time such that not all of the historical documents end up being accounted for in the databases or such that some documents are not fully accounted for (e.g., due to portions of information being missing from the database). For example, there could be technical errors that may have occurred in the process of recording the information such as errors in the entry of the information or its recognition in the documents. In some cases, it may be possible to complete or resume the process of fully accounting for the information in the documents. However, some automated information extraction models (i.e., neural networks configured to extract information from documents) often require large numbers of marked up documents to provide a useful level of information detection accuracy. This is often due the documents of various origins and/or types having differing specific structures (e.g., with respect to the location of the fields, the content of the documents, the format and type of data, etc.). For some particular types of documents (e.g., documents relating to NLP projects), the task of accurate information detection and extraction can be more complex since correct markup may require specialized knowledge in a particular field (e.g., medical, legal, etc.). Accordingly, these models can be insufficient for performing this task accurately without extensive manual markup.

Aspects and implementations of the instant disclosure address the above noted and other deficiencies by providing efficient mechanisms for automated markup of documents on which information extraction models are trained. In some implementations, regions or fields in documents can be identified and marked using information obtained from data structures (e.g., database records) corresponding to those documents. This process can generate an initial markup of a document. Some implementations can train a machine learning model (e.g., a neural network model) to detect and identify information fields in documents using the initial markup of a set of existing documents. The trained model can then be used to process the historical documents and detect fields and identify the type of information they should contain in those documents.

By comparing the fields detected by the trained model with those identified using the data structures (i.e., database records), the various implementations disclosed herein can determine whether the markup of the document generated from the trained model is valid and/or determine a measure of the markup's accuracy. In some embodiments, invalid markup or markup of insufficient accuracy can be verified and/or modified by input received from a user interface. In some implementations, the model can be further trained and retrained using additional sets of documents. The various implementations can use the retrained model to process (i.e., to detect information in, identify information in, extract information from) previously unseen documents.

Accordingly, the implementations described further have multiple advantages over the existing technology and approaches. Firstly, the various implementations can quickly and efficiently train a model (e.g., a neural network model) to detect information using the automated markup obtained according to the mechanisms disclosed in more detail below. Additionally, models trained according to the techniques described herein can be used to process previously unseen documents with a specified accuracy. Moreover, these mechanisms significantly reduce both the amount of manual input and the time used for training of the models.

Figure 3:
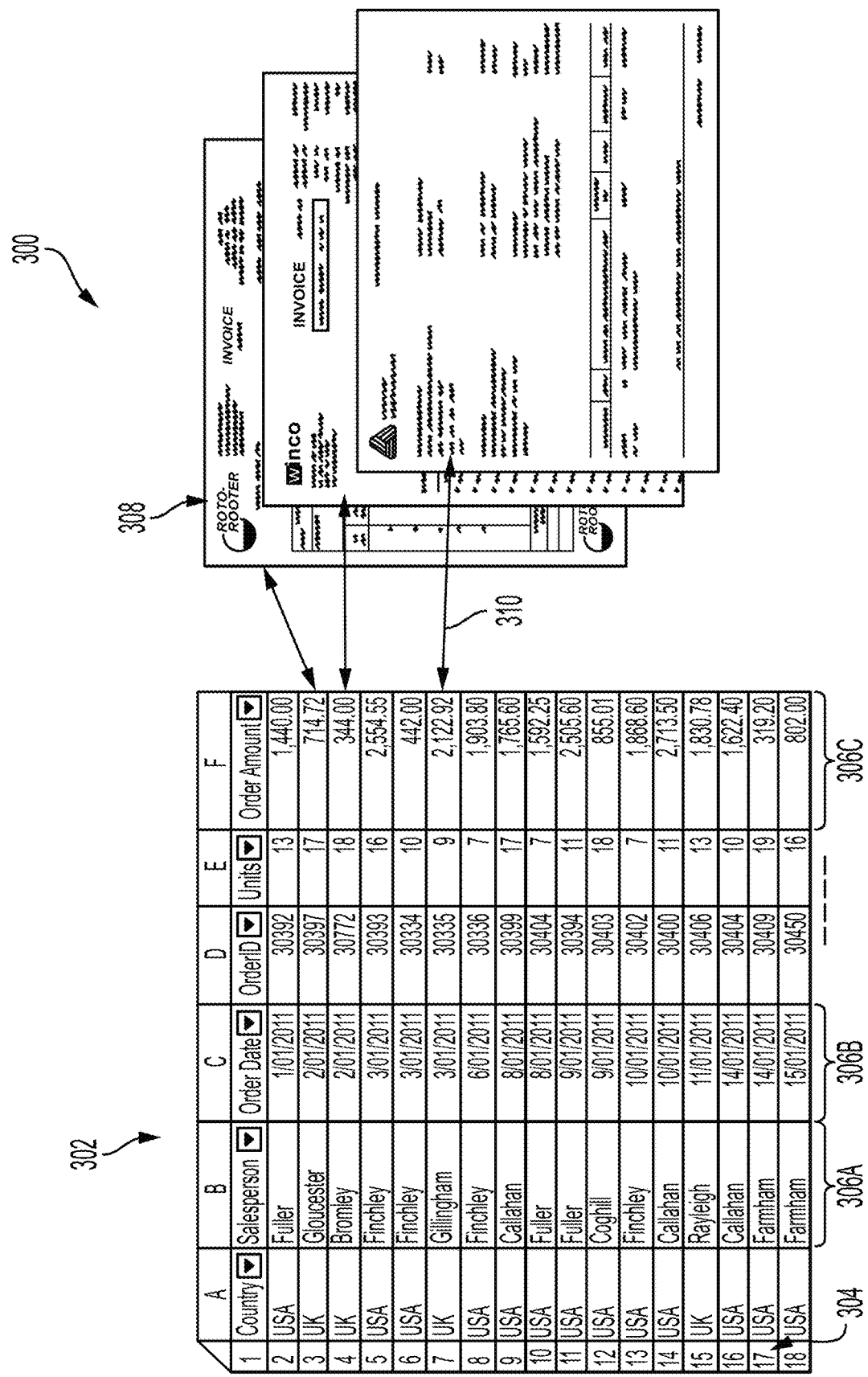
FIG. 3 is a block diagram illustrating a record containing entries related to documents, in accordance with some implementations of the present disclosure.
Figure 4:
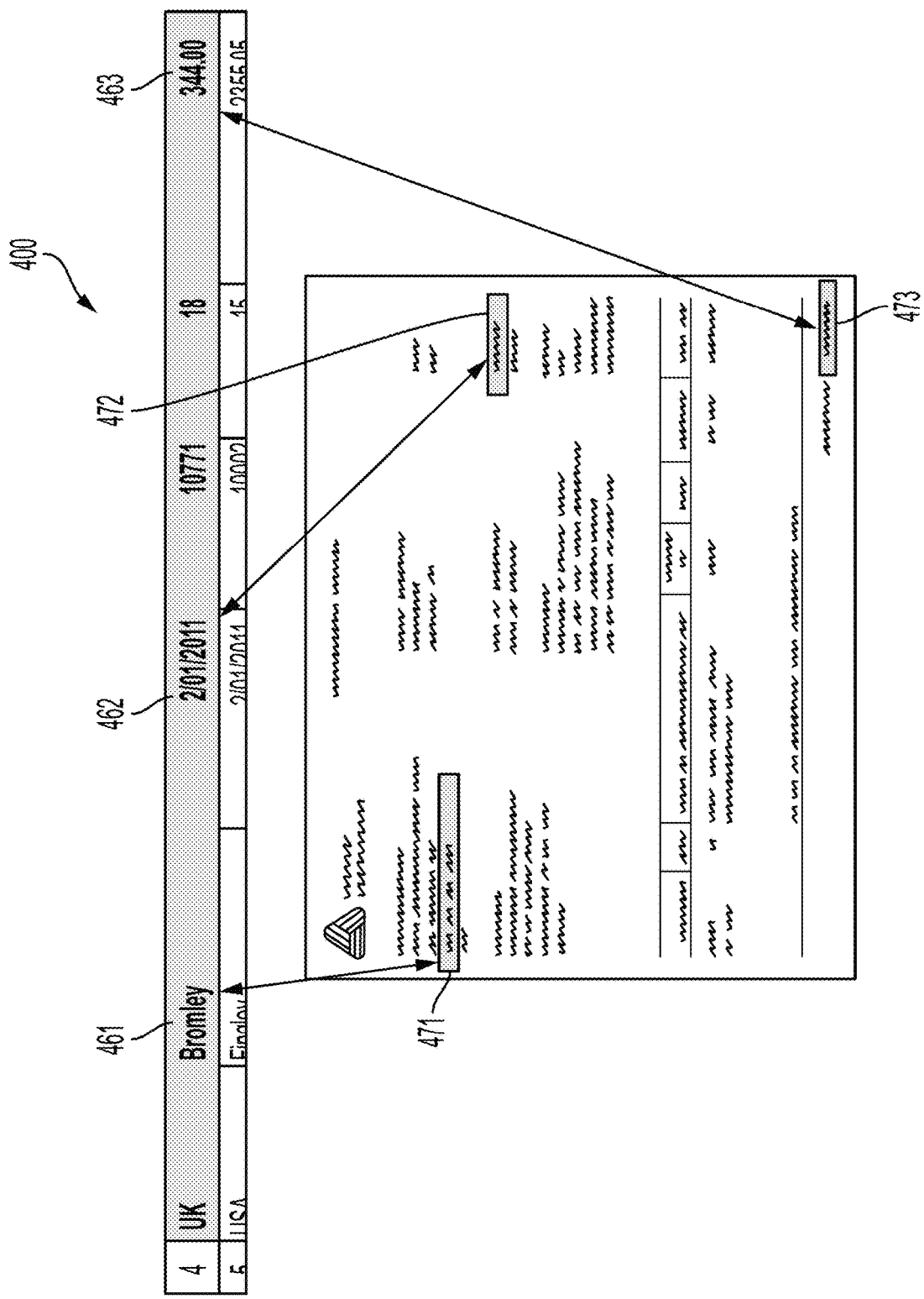
FIG. 4 illustrates a correspondence between entries in the record and information in a document, in accordance with some implementations of the present disclosure.

Initially, some aspects are broadly described with reference to FIG. 1, which depicts a high level flow diagram of an example method 100 for training a model to extract information from documents using automatic markup based on historical data, in accordance with some implementations of the present disclosure. The method 100 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 100 can be performed by the computer system 700, the processing device 702 (e.g., a processor), another component of computer system 700, or a combination thereof, as described in more detail with reference to FIG. 7. Although the elements (e.g., stages, steps, actions, tasks, states, events, activities, operations, functions, etc.) of the method are shown in a particular sequence or order, the order of the stages of the processes can be modified. Thus, the illustrated implementation should serve only as an example, since the illustrated processes can be performed in a different order, and since some processes can be performed in parallel. Further, in some implementations, one or more stages or processes can be omitted. Thus, not all stages and processes can be required for every implementation since other process flows are contemplated by this disclosure. For added clarity, the method 100 is described with additional reference to FIG. 3, which illustrates a record containing entries related to documents and to FIG. 4, which illustrates a correspondence between entries in the record and information in a document, in accordance with some implementations of the present disclosure.

The implementations described below can utilize a set of documents. Thus, in some implementations, the processing logic can, at operation 101, access the set of documents 308 (e.g., in digitized form) in a data store or a data structure (e.g., database (DB)) 302. In other embodiments, the processing logic can, at operation 101, receive one or more documents 308 from a database 302 or a data store. In some cases, the documents 308 could be in paper form or they could have previously been converted into electronic form by for example, being scanned, processed for optical character recognition (also referred to as "OCR" and "OCRing" herein). In some implementations where the documents in the collection 308 are accessible in paper form, then they can be digitized (e.g., scanned, photographed) and OCRed for subsequent use. Further, the various implementations can utilize a set of data such as a DB 302 of one or more records 304 containing information relating to the documents (i.e., the content of the documents) in the collection 308.

In some implementations, the data in the database 302 might not accurately reflect the information contained in the documents in the collection. For example, the data could ha have been entered incongruously or otherwise heterogeneously. In another example, the data could have been entered partially (e.g., when not all the data from all the information fields from the documents in the collections are reflected in the database) or vice versa the data could have been entered from an extraneous source (e.g., some additional data could have been entered into the database in the form of objects, elements, identifiers that are not present on the documents themselves but nevertheless characterize the document or relate to it as in the case of a reference to a vendor to whom the document relates, date of the document's receipt, etc.).

As used herein, an element of a record in a data structure (e.g., a record in a database) can refer to a data structure containing a single item of data. Further the term "field" of a document can refer to an area or portion of the document. Further, for the purposes of this disclosure, the term "entry" can refer to a element containing content in a record of a data structure (e.g., a non-empty cell in a row of a database table). In some implementations, the database 302 can include a data table or a spreadsheet. In other implementations, the database 302 could be a normalized relational database, where may utilize data dictionaries for at least some data fields. For example, a date or address on a document can be expressed in one format (e.g., MM-DD-YY), while in the database it can be expressed in another format (e.g., YYYY-MM-DD). In another example, the database can include the name of a client and its corresponding identifier (ID), while the document contains only the name or only the ID of the client. Another example a long form street address (e.g., 123 Main Avenue, Anytown, New York in the United States) can be converted to a standardized or abbreviated form (123 Main Ave., NY, US, 12345).

Further, in the various implementations, the data structure can be a database containing multiple records where each record includes multiple elements or entries. In such implementations, each record can be represented as a row in a table and each element in the record can be represented by a cell or entry in the row. Accordingly, in implementations such as those where the database data elements are structured as blank cells or entries in rows of a table where each row uniquely corresponds to a single particular document, each such record 304 (i.e., row of entries) can be associated with or can include information identifying the document to which it corresponds. For example, in some implementations, each of the database records 304 can respectively contain an attribute, an address, or a reference that associates the record with or connects it to a specific corresponding 310 document of the collection (i.e., in cases where the document is stored in digital format separately from the records in the database). In other implementations, a document image or a digital version of the document 308 (e.g., a scan of the document in PDF format) can be directly attached to or form part of the record in the database (e.g., as an entry in the corresponding record).

In some implementations, the documents in the collection 308 and the documents to which the records of the data structure (e.g., database) 302 pertain, can be either of a type previously processed by the processing logic (e.g., an invoice, a check, etc.), or of an unknown type, which the processing logic may not have processed. An example case may include the processing logic preforming the method 100 for a company that possesses a collection of a large number of insurance policy documents and a database with corresponding personal data of clients, amounts (e.g., amounts of insurance payments both individually and in aggregate), addresses, dates, etc. Accordingly, in this case, where the processing logic has not previously processed these types of documents, as well as in other implementations, the processing logic can, as described in more detail below, train an information extraction model prior to using it to automatically extract information from new unmarked documents.

Thus, in some implementations, the processing logic can, at operation 102 identify, in a database 302, one or more records 304, such that each record corresponds to a respective document of a set of documents. In some implementations, each record 304 in the database 302 can correspond to a document 308. Each record can include one or more entries 461, 462, 463 and each entry can be associated with a corresponding class of information 306A, 306B, 306C. Accordingly, in some implementations, at operation 102, the processing logic can identify the regions of the fields on the document using the corresponding information from the database (e.g., character strings in the entries of the records in the database). In some cases, by using the entries of each record in the database, the processing logic can identify the corresponding locations of (e.g., coordinates of a bounding rectangle) the fields and the classes of information from the database to which the information in the field corresponds (e.g., by creating an entry in the data structure or in another location associating the field or its location with the class of information contained in it). In some implementations, the processing logic can mark the data fields on each document (e.g., marking the field with an indication of a respective class of information from the database to which the information in the field corresponds), to generate a training set of marked documents (also referred to as the initial "automatic markup" of the documents).

For example, an item of information (e.g., "Document date"—05/01/20) can be present as an element in the database, and the processing logic can identify on the document where this field (e.g., text string, information fragment, etc.) appears and highlight or mark it (e.g., circle it, highlight it with a color, etc.). Further, in some implementations, the processing logic can mark or flag the identified field with a certain class or category indicator that indicates the type (i.e., class) of information contained in the field. In this example, the class of information in the field is the "Date" of the document. Thus, classes 306A, 306B, 306C can characterize the columns of the database 302 by defining the type of content or information that it contains.

In some implementations, the processing logic can, at operation 102, identify the location containing the corresponding information in the document for each of the elements of each record in the database (e.g., identifying the "invoice amount", "document number", "company name", "company address", etc.). In other words, the processing logic can, at operation 102, separately for each historical document in the collection, identify all the information contained in the database corresponding to that document and then locate where the corresponding field containing the information is located in the document (e.g., by determining the coordinates of a bounding rectangle containing defining the field that includes the corresponding information).

In some implementations, marking the data fields on each document can include generating one or more proposed correspondence associations between entries from the record and items of information in the document by using one or more character string identification techniques. In these or other implementations, at operation 102, the processing logic can determine for each entry of the record, a corresponding degree of association between the entry and a respective item of information referenced by the entry. These character string identification methods can, for example, include (a) identifying character strings using a word search, (b) detecting fields with a neural network model, (c) identifying character strings using a word embedding comparison, and (d) and receiving identification of character strings from a user interface (e.g., receiving user input identifying the character strings). The identification and related marking of data fields in the documents of the collection are explained more thoroughly below with reference to FIG. 2.

Consequently, in some implementations, by identifying and locating the fields in the documents of the collection corresponding to the entries 461, 462, 463 in the database, the processing logic can conclude operation 102 with the generation of an initial automatic markup of all documents from the collection where the corresponding fields 471, 472, 473 are highlighted, colored, circled, or otherwise marked in a human-readable or computer-readable manner. In some implementations, the processing logic can partially identify or partially locate the fields (i.e., identify and/or locate only some but not all of the fields) containing the information corresponding to the entries in the database, or that the processing logic determines the fields on the document with low accuracy.

Further, in some implementations, the processing logic can receive the automatic markup of the documents in the collection and utilize a machine learning model for subsequent extraction of information from documents. In the various implementations, machine learning models can include e.g., a single level of linear or non-linear operations (e.g., a support vector machine [SVM]) or can include a deep neural network, e.g., a machine learning model that is composed of multiple levels of non-linear operations. Examples of deep neural networks are neural networks including convolutional neural networks, recurrent neural networks (RNN) with one or more hidden layers, and fully connected neural networks. In some implementations, the machine learning model(s) can include one or more neural networks. The neural networks implementing the machine learning models may include multiple neurons that are each associated with learnable weights and biases. The neurons may be arranged in layers. In some implementations, the neural network system can include one or more subnetworks where each of the subnetworks can include multiple neuron layers and can be configured to perform one or more functions described in the present disclosure.

Accordingly, at operation 106, the processing logic can train a machine learning model, using the training set of marked documents (i.e., the automatically obtained markup of the documents in the collection), to detect data fields on documents. Training of the neural network can include varying the parameters of the neural network (e.g., adjusting the weights associated with each neuron) to optimize prediction (e.g., information identification/extraction) accuracy. As a result of the model being trained, at operation 106, on the received automatic markup, a trained model is generated which is capable of extracting data from the type(s) of documents on which it was trained. Accordingly, the resulting model can be used on previously unseen documents of the known document types. Thus, automatic markup can generate a training data set quickly from an existing collection of documents without reliance on extensive input from a user interface, thereby significantly speeding up the training process and enabling the quick initiation of new document processing.

In some implementations, prior to initialization, the quality with which the model trained on the primary markup at operation 106, identifies fields and information in documents that are not marked up might not initially be known. Thus, the processing logic can, at operation 110, process the documents in the collection using the trained machine learning model to mark data fields on each document. For example, the processing logic can, at operation 110, run the trained model on some or all of the historical documents and identify the fields in them. The trained model can then locate or identify the fields on the documents and indicate the class of information that they contain.

Consequently, at operation 114, the processing logic can use the information from the database to evaluate or verify the accuracy of the results from the model. This can include the processing logic comparing the data fields marked using the trained machine learning model at operation 110 with the data fields marked using the entries of each record at operation 102 to determine a measure of mark-up accuracy. Thus, for a particular document, the processing logic can, at operation 114, compare the set of data fields marked using the trained machine learning model with the data fields identified and marked using the entries of records in the database. In other words, the fields found on the document by the model and the fields found using elements of the database record for that document can be compared to determine whether they coincide or whether there are any differences.

Based on the comparison performed at operation 114, the processing logic can, at operation 118, determine whether or not the markup (e.g., of one or more documents/document images) provided by the model is valid or not. In some implementations, as explained in more detail below this can include the processing logic determining whether the measure of markup accuracy satisfies a criterion (e.g., whether an aggregate measure of the probability that an identified field on a document corresponds to a specified element in a record associated with the document in a data structure). The threshold criterion can be a pre-determined measure of markup overlap and can in some embodiments, for example, be a threshold portion (e.g., 80%) of the fields identically identified/marked at both operation 102 and at operation 110. In some implementations, the processing logic determining that the measure of markup accuracy satisfies the criterion at operation 118 can include the processing logic determining whether the measure of markup accuracy exceeds a threshold value indicating the measure of markup overlap.

Thus, in cases where the field identified by the machine learning model at operation 110 coincide (e.g., match exactly or meet a pre-determined measure of overlap) with the ones identified using the database information at operation 102, the markup of the document produced by the trained model can be referred to as valid. Conversely, where the fields identified by the machine learning model at operation 110 did not meet a pre-determined measure of overlap (e.g., where an aggregate value of the weights associated with respective proposed correspondence associations fall below a pre-determined threshold value, the markup of the document produced by the trained model can be referred to as unreliable markup or as invalid.

In some implementations, responsive to determining that the measure of markup accuracy does not satisfy the criterion, the processing logic can, at operation 122, the unreliable (i.e., invalid) markup obtained at operation 114 can be sent for verification to a user interface, after which the processing logic can receive the corrections that make the markup accurate. Accordingly, at operation 126, the processing logic can receive or generate accurate reliable markup that is valid and is based on the verifications and corrections made at operation 122.

In some implementations, having obtained, at operation 126, the valid markup, the processing logic can, at operation 130, the processing logic can train the model on the received reliable markup that has been corrected or verified as valid by receiving input from a user interface. Thus, training the information extraction machine learning model on valid markup at operation 130, can result in an updated trained model which can identify and mark fields on documents with a higher level of accuracy than it could previously (e.g., than at operation 110).

Therefore, either after determining that the markup is valid at operation 118, in some implementations, or after correcting the markup and retraining the model in operations 122, 126, and 130, the processing logic can use the trained model to process new documents. Accordingly, in some implementations, responsive to determining at operation 118 that the measure of markup accuracy satisfies the criterion, the processing logic can, at operation 134, process a new document using the trained machine learning model. Analogously, in some embodiment, after training or retraining the model on the corrected markup verified as valid markup, the processing logic can, at operation 134, process one or more new documents using the trained machine learning model.

Notably, the operation of the updated model (i.e., a model trained on the valid markup) can generate markup of documents (i.e., both previously processed documents and documents that the model has not previously processed) with a higher quality or accuracy. In other words, it can identify the fields and their corresponding information classes in new documents with a higher level of accuracy than prior to the training. As a result, the processing logic can then identify the information in the documents and continue populating information from the fields in the document (e.g., of a particular type) into the corresponding entries and records in the database with high accuracy and quality. In some implementations, a level of accuracy or a measure of quality can be represented as a percentage of fields on the document correctly identified as corresponding to a data item in the data structure. Accordingly, in some implementations, the accuracy categories (e.g., high, medium, low) can be predefined to correspond to respective accuracy percentage ranges (e.g., <50%, 50-70%, 70%<). Thus, when the processing logic receives documents of a similar type, it can process them and cause the information in the fields identified by the model trained on historical data to be entered into the database with high level of quality. In some implementations, new documents received by the processing logic can initially be subjected to OCR processing prior to undergoing the aforementioned process.

Figure 2:
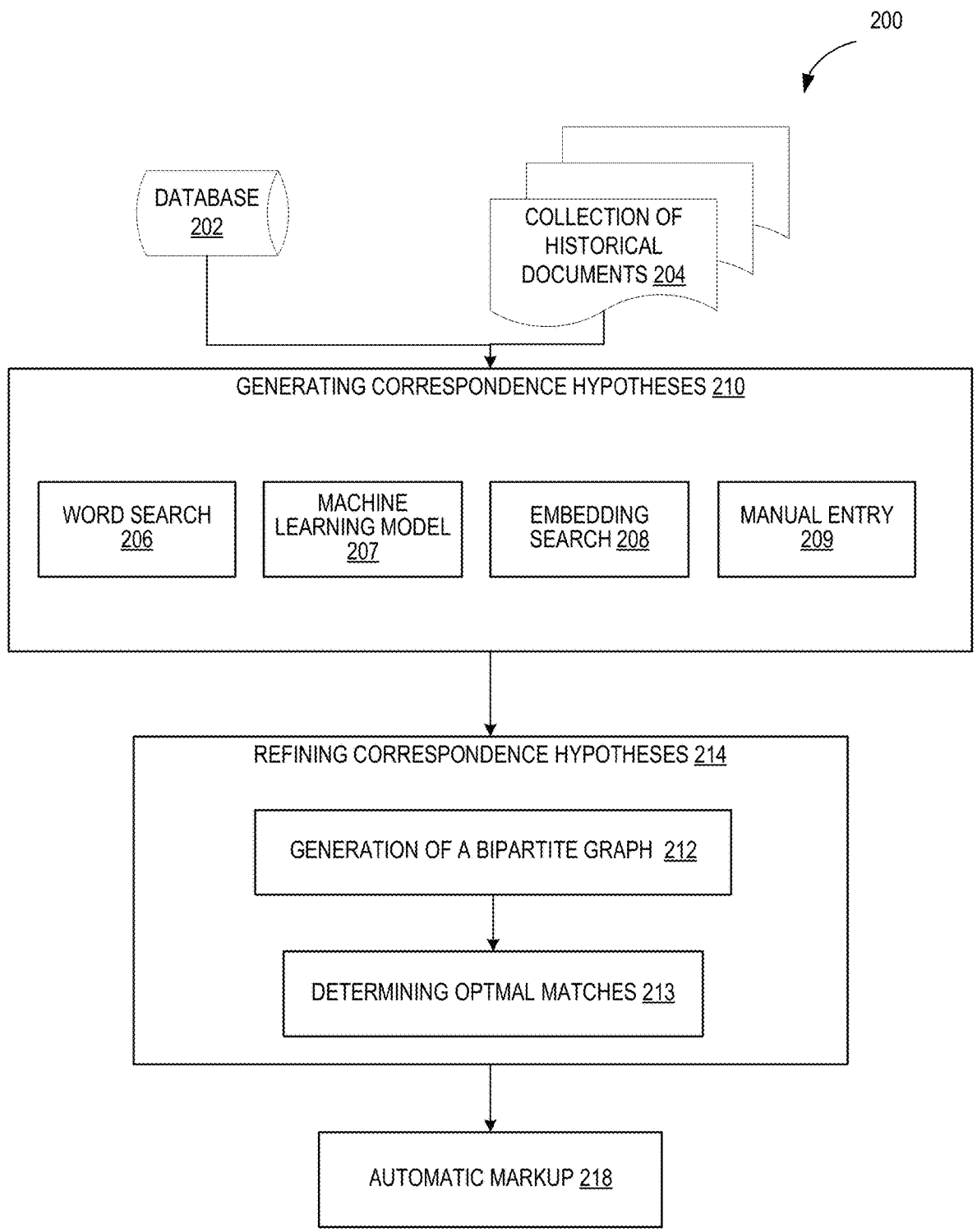
FIG. 2 depicts a high level flow diagram of an example method for automatically marking up documents, in accordance with some implementations of the present disclosure.

The stage of identifying data fields in a document and obtaining the corresponding automatic markup of one or more documents is described as follows. FIG. 2 is a flowchart of the automatic labeling process and depicts an example method 200 for automatically marking up documents, in accordance with some implementations of the present disclosure. The method 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 can be performed by the computer system 700, the processing device 702 (e.g., a processor), another component of computer system 700, or a combination thereof, as described in more detail with reference to FIG. 7. Although the elements (e.g., stages, steps, actions, tasks, states, events, activities, operations, functions, etc.) of the method are shown in a particular sequence or order, the order of the stages of the processes can be modified. Thus, the illustrated implementation should serve only as an example, since the illustrated processes can be performed in a different order, and since some processes can be performed in parallel. Further, in some implementations, one or more stages or processes can be omitted. Thus, not all stages and processes can be required for every implementation since other process flows are contemplated by this disclosure. For added clarity, the method 200 is described with additional reference to FIG. 5, which illustrates several potential correspondences between an entry in the record and respective parts of a document, in accordance with some implementations of the present disclosure.

In some implementations, as noted previously, the processing logic can receive a document from a collection of historical documents 204 and can receive information from a database 202. The processing logic can identify, in the database 202, a record corresponding to the document where the record can include one or more entries. In some implementations, each entry can contain data that reflects a respective item of information identified in a corresponding part of the document. As mentioned above, the data from the database can in some cases completely match the information on the document (e.g., what is physically written in the document), while in other cases it can either not match or match only partially. Discrepancies can arise, for example, due to database record entry normalization. In some cases, some identifiers or labels of information from the database may, for example, not match the corresponding identifiers or labels of fields on real documents (e.g., a number bay be labeled as an "internal contract number" on the document, while in the database it can be listed as "external contract number", since from the perspective of an operator/organization in possession of the document, the contract is external). In other cases, data may have been lost over time or entered incorrectly into the database. In other situations, documents in the collection may have been partially or completely lost, destroyed, or damaged.

Thus, the processing logic can proceed to find reliable proposed correspondence associations (i.e., associations of potential respective information record elements from the database and corresponding information items on the relevant documents). Accordingly, the processing logic can at operation 210, generate, using a character string identification method, one or more proposed correspondence associations, where each proposed correspondence association indicates a measure of correspondence between a respective entry 562 from the record and a corresponding item 572A, 572B, 572C of information identified in the document. For the purposes of this disclosure a proposed correspondence association can refer to a correspondence hypothesis such as a correspondence hypothesis that associates a respective entry 562 from the record with a hypothetically corresponding item 572A, 572B, 572C of information identified in the document. Thus, at operation 210, the processing logic can determine, for each entry 562 of the record, a corresponding degree of association between the entry and a respective item 572A, 572B, 572C of information referenced by the entry. In the context of this operation, several different approached for obtaining proposed correspondence associations are further elaborated. Note that either sequentially or in parallel, in various implementations disclosed herein, various combinations of methods for obtaining these proposed correspondence associations can be used. In some implementations, either all four methods, three, two, or even just one of them can be selected to be used and the decision can depend on the context of the various types of documents (e.g., various types of presentation of information on the documents, etc.) which are to be processed. To select a character string identification method or methods, in some implementations, a preliminary analysis or processing of documents can be carried out. Notably, the processing logic can initially be configured with the ability to find proposed correspondence associations of potential fields on documents in various ways. The number of proposed correspondence associations obtained by the processing logic can depend on, among other things, the number of methods used to obtain them and on other possible factors.

Thus, in the various implementations, at operation 210, the processing logic can generate proposed correspondence associations in various ways including by (a) word matching though a search (e.g., by a text search, a full-text search), (b) using a machine learning model, (c) matching by embeddings, and/or (d) receiving input receiving input from a user interface (e.g., full or partial selection or identification of fields on a document). Accordingly, in the various implementations, each of the character string identification methods can include one or more of (a) identifying character strings using a word search 206, (b) detecting fields with a neural network model 207, (c) identifying character strings using a word embedding comparison 208.

In some implementations, the word search 206 includes the processing logic searching a body of text in the document for a character string from the entry from the record (i.e., in the database) by performing one or more of an exact string search, a prefix search, an approximate string search, and an approximate prefix search. This method can include the processing logic executing a full-text search mechanism (e.g., a Text Retrieval System (TRS)) on an OCRed document that corresponds to a specific record, for words that are found in the database fields. Searches can be conducted for occurrences of each word present in the record. The accuracy of such an approach can be directly dependent on the number of errors present in the records in the database. Accordingly, based on the identified and located words on the document, the processing logic can form corresponding proposed correspondence associations for the correspondence of each field on the document with an entry in the database record for that document.

In some implementations, the full-text search system (TRS) can create an index of a corpus of text(s) and search through this text corpus. A corpus of texts can refer to a separate document or some set (i.e., collection) of documents from which a text can be obtained. In some implementations, the processing logic can have morphological support for several languages and can search for different forms (i.e., variations) of a word if the word belongs to one of the supported languages. In some implementations, the search can be conducted not only of the words themselves, but also of arbitrary attributes (e.g., color, size) associated with the word, if such attributes were specified during indexing. In some implementations, the full-text search index may not need to include all of the content or the entirety of each of the documents themselves. In some cases, in can store only the positions of the words in the documents, the words themselves, and/or their attributes (i.e., where attributes of such words are indicated or found on the document). In some implementations, the search can be conducted on individual fragments or portions of the documents instead of the entirety of each document.

In some implementations, the processing logic, at operation 206, can perform one or more of the following types of search: (i) exact word search; (ii) prefix search (i.e., searching all words in the index for which the searched word is a prefix); (iii) a fuzzy word search; (iv) a fuzzy prefix search (i.e., determination of all words in the index for which the searched word is a prefix using fuzzy comparisons); a (v) wildcard search (i.e., where a template pattern is set containing ordinary characters as well as a "?" (e.g., any character indication) or a "*" (e.g., an indication of any combination of characters, including empty characters/blanks)).

A fuzzy word search, as used in this disclosure, can refer to a simplified version of the TRS system mechanism or as a separate mechanism or component of the TRS system. A fuzzy regular expression, Fuzzy RegEx, can use the Levenshtein distance equation to measure the difference between a regular expression and potential text matches. The difference or similarity (i.e., in terms of a percentage) between the regular expression pattern and the matched text can be expressed as a "confidence score" (e.g., a percentage). If the resulting confidence score is above a pre-determined specified threshold score (e.g., 90%), the matched expression pair can be kept for later use as a proposed correspondence association. If the resulting confidence score is below the threshold, the matched expression pair can be discarded.

For example, a text string that is 95% similar to a regular expression pattern may differ by only one character. If the minimum similarity threshold is set to 90%, the matched resulting pair of expressions will be returned even if the pattern does not exactly match the text. This type of comparison may result in a certain number of errors (e.g., a matching pair such as Bew York—New York can be returned). Further, in some cases, this option can be completely untenable in situation where setting the field text is completely different from its corresponding entry in a database. Such a situation can include, for example, a completely modified or abbreviated spelling in a product's description field (e.g., a full description compared with a partial description, or an encoded description of a product item). In such cases, it can be assumed that the record in the database contains entries that are normalized. Thus in some embodiments, if as a result of a search being conducted, matching words are found, the processing logic can record an indication of an absence of a match for a particular item of information form the record on the document being processed.

In some implementations, the result of the TRS search (i.e., text search using the TRS mechanism) can be an array of document identifiers that satisfy the search query (i.e., each document in the array satisfies the requirements set out in the search query). The search query (e.g., based on the corresponding string from the database) can indicate which words should be contained in the document and in what combinations with other words. In some implementations, for each document from the search result, the processing logic can receive a list of coordinates of such words in a particular document, where the coordinates and the indication of the matching word can form part of the proposed correspondence association. Such matching words obtained as a result of the search can be referred to as hits (i.e., search hits). For each such hit, the processing logic can identify the word from the query that the hit matches (e.g., if a unique identifier is assigned to each word in the query). Then for each hit obtained by the search, the processing logic can generate a list of word identifiers from the query. In addition, in some cases, for each hit, the processing logic can record the form of the word stored in the index (i.e., the form of the word in the source text of the document). Thus, each hit can be recorded by the processing logic and a corresponding method by which it was obtained along with a respective confidence value can be stored in metadata associated with the hit.

Further, using a machine learning model 207 as a character string identification method can involve the processing logic utilizing an existing field detection means at operation 210. In some implementations, to generate the proposed correspondence associations of potential corresponding fields on the document, a trained field detection tool (e.g., an existing neural network model for field detection) can be used. Thus, at operation 210, the processing logic can use a machine learning model 207 to generate a proposed correspondence association that indicates correspondences between a character string (e.g., a word) from the database to a particular corresponding field on the OCRed document. In some implementations, as part of operation 210, the processing logic can use a machine learning model 207 to determine, for each entry of the record, a corresponding degree of association between the entry and a respective item of information referenced by the entry. In some implementation, the processing logic detecting fields with the neural network model 207 can also include marking one or more areas in a document as fields, where each field is associated with a particular class of information. This can further include matching a character string from the entry in the record with one or more fields based on the class of information associated with each field as explained in more detail below.

For example, initially, for a particular entry in a record in the database, various possible combinations of words can be generated from the words of documents according to given rules (e.g., words immediately to the right can be x). Next, a set of rules is generated based on the types of information that can be contained in the entry on the database and the corresponding field in the document (i.e., each rule in the set of rules depends on the type of information that the entry/field can contain). Rules can be set by taking into account, for example, expert experience (e.g., knowledge) and/or static data sampling. For example, one such rule can be that an address can consist of 1-10 words, which are distributed from 1-5 uninterrupted character string per line, in accordance with the relevant expert/statistical data about the address field from the field nomenclature (e.g., product, total, vendor, etc.).

Accordingly, in the several embodiments, a proposed correspondence association can, for example, include the potential geometric location of the character string on the document and the potential number of characters within the character string. For example, the processing logic can generate a proposed correspondence association that includes a combination of the coordinates of the region (e.g., rectangle) on the document where a character string matching a character string in the database record is found, a corresponding confidence value, and a corresponding class/category of information in database. For each character string (i.e., contained in an entry) of the record, the processing logic can determine a corresponding degree of association between the character string and the respective the region on the document where item of information referenced by the entry is located. To generate a set of proposed correspondence associations, the processing logic can operate as "a proposed correspondence association generator". Thus, for example, the generator can generate 5, 10, 20, etc. proposed correspondence associations for a particular character string with respect to a field on the document in which it may be found. In some implementations, the processing logic can generate proposed correspondence associations each indicating that a character string corresponds to one of the fields of the document. In the various implementations, the processing logic can, determine, for each character string of the record, a corresponding degree of association between the character string and the respective document field that contains the item of information referenced by the character string. For example, in total there can be 300, 500, 800, etc. proposed correspondence associations indicating a potential field in which the target character string might be found in the document.

After the generation of proposed correspondence associations, the set of generated proposed correspondence associations can be fed as an input to another portion of the processing logic operating as a "proposed correspondence association enumerator". Consequently, the processing logic, can assign a weight (i.e., a coefficient reflecting the probability that the entry corresponds to a particular region on the document) to each of the proposed correspondence associations. In some implementations, this weight, can reflect the measure or the corresponding degree of association between the entry of the record and the respective item of information. In the same or other implementations this weight, can reflect the measure or the corresponding degree of association between the character string and the respective the region on the document where item of information referenced by the entry is located. As the proposed correspondence association enumerator iterates through each proposed correspondence association in the set of proposed correspondence associations, it can calculate an aggregate sum of coefficients (e.g., weights) of the proposed correspondence associations of the fields and respective database record elements. The enumerator can calculate the aggregate value of the coefficients (i.e., indications of a degree of association) of for each of the proposed correspondence associations generated for each of the fields. Thus, a one or more chains (i.e., sets) of proposed correspondence associations (i.e., each containing values of locations, confidence, length, and/or other attributes) for each of the fields in the document is formed. For example, the processing logic can generate a proposed correspondence association indicating that character string Word-1 is associated with the information in document region R1 with a weight of 0.95 (indicating a probability of 95%) and that Word-2 is associated with the information in document region R1 with a weight of 0.65 (indicating a probability of 65%) and is associated with the information in document region R2 with 60% probability. Rather than deciding that Word-2 should be associated with field R1 (according to the higher probability), the processing logic can analyze two chains of hypothesis: (1) Word-1 is associated with the information in document region R1 and Word-2 is associated with the information in document region R1, and (2) Word-1 is associated with the information in document region R1 and Word-2 is associated with the information in document region R2. Because different entries in the database should not correspond to the same area in the document, the aggregate weight of the proposed correspondence associations of chain (2) is higher in total. The processing logic then determine that it is more likely that Word-1 and Word-2 are respectively associated with information in different document regions than that they are respectively associated with information in the same document regions. Consequently, the processing logic can calculate a function that selects a certain maximum value from the values in the various chains. In some implementations, the processing logic can calculate a function that maximizes an aggregate degree of association of a set of degrees of association. For example, the proposed correspondence association indicating that character string Word-2 corresponds to the information in document region R2 can be maximize an aggregate sum of weights of the proposed correspondence associations within the chains of proposed correspondence associations. In another example, a chain of proposed correspondence associations that leaves some entries uncorrelated with any document areas may be disfavored compared with a chain that associates at least one document area to each of the entries in the database. Thus, as a result of the operation of the enumerator, chains that contain proposed correspondence associations associated with the character strings in particular fields on the document can be selected based on the calculated function.

After the proposed correspondence associations enumerator has processed each character string, the processing logic can select, among the one or more proposed correspondence associations, those proposed correspondence associations that collectively or in the aggregate indicate a certain degree of association (i.e., collectively have an aggregate measure of correspondence) that satisfies a criterion. In several implementations, the processing logic can select, among the corresponding degrees of associations that have been determined, a set of corresponding degrees of association whose aggregate degree of association satisfies a criterion. In some implementation the degree of association can be indicated by the weight coefficient and collectively the aggregate weight values can represent the degree of association for a set of multiple proposed correspondence associations. In some implementations, the criterion can be satisfied if a value (e.g., a weight value indicating a probability of a proposed correspondence association being valid) equals or exceeds a pre-determined threshold value or a minimum value, while in other implementations, the criterion can be satisfied if the value is equal to or less than a pre-determined threshold value or a maximum value. For example, the criterion can be satisfied by a value of a measure of probability that the proposed correspondence association is valid exceeding a threshold probability (e.g., 65%). In another example, the criterion can be satisfied if a maximal aggregate weight coefficient value of a set of proposed correspondence associations is obtained by a particular combination or number of proposed correspondence associations forming the set. Accordingly, in some examples, the processing logic can select the proposed correspondence association with the maximum weight or the proposed correspondence associations of a chain that has a maximum aggregate weight value for all the proposed correspondence association in the chain. Thus, in such implementations, the processing logic would select the set of corresponding degrees of association whose aggregate degree of association is maximized or otherwise satisfies a criterion among the corresponding degrees of associations that have been determined. Accordingly, a collection of words (i.e., from among all of the words in the document) that are associated with each of the given document fields according to their respective nomenclature can be generated. After the word set is generated, the processing logic can identify the field in the document by determining the proposed correspondence association with the highest weight (e.g., aggregate confidence value). As a result, a potential region in the image can be identified as a field after the trained generator is tested.

In some embodiments, a word embedding search 208 can be used as character string identification method by the processing logic at operation 210. Word embedding entails a representation of words and information in a document and in the database in a particular abstract form, e.g., a vector representation (referred to as a word embedding since it relates to the relationship of a given word with other words among which it can be embedded). The vector representations of words can be close to one another in geometric vector space if the meaning of the words is close, and vice versa. Thus, in some embodiments, the processing logic identifying character strings through the word embedding comparison 208 can include generating a vector representation reflecting a character string from an entry in the database record, and identifying, in a document, the character string reflected by another vector representation that, among a set of vector representations of character strings in the document, is closest in vector space to the first vector representation as explained in more detail below. For example, it can include the processing logic generating a vector representation encoding a character string of the entry in the record, and determining, a second vector representation that, among a set of vector representations of character strings in the document, is closest in vector space to the first vector representation. It can further include the processing logic identifying, in the document, the character string encoded by the second vector representation. Notably the word embedding search character string identification method may not require a complete exact match and can operate irrespective of the number of errors contained in the database records.

To perform a word embedding search 208, initially, the processing logic can represent all the information in the entries (e.g., words/fields/cells) available in the database record as vectorized embeddings (e.g., by using known tools such as Word2vec or other suitable trained methods). These embeddings can be collected and stored as an array (e.g., Array1).

Further, in some implementations, the collection of historical documents can be OCRed (e.g., if documents stored in the collection have not undergone character recognition). Then, for example, in some cases, the processing logic can identify and collect paragraphs, lines, etc. in the documents by known methods. After that, for each word from the document, the processing logic can determine stable links/combinations of words (e.g., from 2-4 or 2-10 words). These word combinations can be determined using various known algorithms such as the nearest neighbor algorithm (e.g., to determine the nearest neighbors on the right for a given word).

Individual words or meaningful combinations of words, phrases, sentences can be represented/encoded by the vector embeddings (i.e., vectors of fixed length, for example, 10-12 digits), for example, through Word2vec or other suitable trained methods. Thus, vector embeddings can be generated for each stable combinations of words on the document. The embeddings of each of the stable combinations on the document can be collected and stored as another array (e.g., Array2).

As a result, two arrays of embeddings can be generated, one array including encodings of words from the database and the other array including encodings of words or stable word combinations from the documents in the collection. Notably, in some embodiments, Array1 can include class labels (i.e., based on data from the database) while Array2 can have no class labels. As noted previously, the term class can refer to the class of the information contained in a field. For example, a field class could be data, vendor, total, address, item description etc. (i.e., corresponding to the name of the columns in the database).

After generating the two arrays of the specified embeddings, the processing logic can compare the embeddings to identify similar ones. In the various implementations, Array1 can contain the same number of embeddings as Array2 (e.g., Array1 can contain 100 embeddings and Array2 can also contain 100 embeddings). In several implementations, various word embedding comparison methods can be used including (i) a pairwise comparison algorithm (e.g., first to first, first to second, first to third, all to all, etc.); (ii) a clear search (e.g., by performing a comparison of all with all and identifying a clear exact match); and/or (iii) a fuzzy search (e.g., to allows a partial comparison of the embeddings, such as comparisons of only those embedding that appear promising). In some implementations, the fuzzy search procedure briefly described below can be implemented. For a document from the database, for each of the fields, the processing logic can compare all embeddings associated with a particular information class with Array2. For example, given a specified field class in a document, such as "vendor" or "date", the processing logic can try to compare all embeddings in Array2 with those in Array1 that are associated with that field information class.

To determine a measure of similarity or correspondence to one another between the embeddings, the processing logic can evaluate the distance or another function in vector space of the respective encodings. For example, the correspondence between encodings can be evaluated by calculating a cosine or Euclidean measure of a distance between them in vector space. A calculation is made of how close each of the respective vector encodings are to one another. In some implementations, the processing logic can determine that pairs of embeddings for which the calculated value of a function (e.g., distance) satisfies a criterion (e.g., the calculated distance between which is below a threshold value) are "close" to each other while those for which the calculated value of a function (e.g., distance) does not satisfy a criterion (e.g., the calculated distance between which is above a threshold value) are "far" from each other. Subsequently, the processing logic can select close embeddings (i.e., encoded vectorized representations) as potential proposed correspondence associations for each particular field. Thus, when all distances between the embeddings stored in Array1 for a particular field class and embeddings in Array2 are calculated, the processing logic can determine stable combinations of embeddings (i.e., phrases/words on the documents with the maximum proximity/distance measure). If several embeddings (i.e., encodings of words/phrases of a document) are evaluated to be close to each other, then they can be considered to be a stable combination and therefore can be considered similar to one another.

The resulting stable combinations can be further evaluated by a trained classifier (e.g., by gradient boosting). In some implementations, the processing logic operating as a classifier can evaluate the "veracity of the combination" for potential inclusion or association with a particular field class. For example, if the threshold correspondence metric (e.g., as represented by a Euclidean distance in vector space) is less than 0.6 (e.g., or another predetermined value), the combination can be discarded, and vice versa, if the threshold is equal to or higher than 0.6, the combination can be retained. Accordingly, in this manner, the processing logic can determine the stable associations and the word embedding search 208 can be completed.

Therefore, based on the comparison of the vector representations, the processing logic can determine that a particular vector representation from the database and a corresponding vector representation from the document coincide with a particular level of accuracy. Accordingly, on that basis, the processing logic can generate a proposed correspondence association (i.e., indicating a correspondence of a particular fragment/portion of the document with a specific entry/field that in the database). In the various implementations, the processing logic can, determine, for each entry of the record, a corresponding degree of association between the entry and the respective item of information referenced by the entry. For each entry, the processing logic can generate several proposed correspondence associations, each of which may not necessarily be definitive. Accordingly, analogously to the generation of the first proposed correspondence association, as a result of comparing vectors, the processing logic can generate a second proposed correspondence association, third proposed correspondence association, etc.

A fuzzy search can be characterized by the fact that it does not require an exact match. In some implementations, a pair of encodings can be deemed to be similar if their calculated encoding distance is within a threshold range of distances (e.g., less than 0.5, 0.6, etc.). For example, consider a situation where the processing logic determined a pair of similar embeddings. However, if the embeddings are decoded back into textual representation, the difference between them can be quite evident when they are compared in textual form. To highlight this possibility, suppose the embedding from Array1 represents the character string "Feb. 21, 2022", and the embedding from Array2 represents the character string "Mar. 19, 2022". From the perspective of comparing the embeddings, each of them can be seen to represent a date. However, although each of them includes the same year (2022) they include different days and month and therefore indicate different actual dates. Thus, in some implementations, the smaller the calculated distance between embeddings, the more similar they can be determined to be. Therefore, in this examples, these two vectors can be determined to be similar up to with some predetermined level of accuracy.

Additionally, if, based on statistical data or experience, the processing logic is provided with an indication that a particular document (e.g., depending on its type and kind) should have only one date, then the processing logic using the embedding search 208 in this case can produce a sufficiently reliable result. Notably, if the processing logic utilized the full text search (i.e., using to the word search 206), it might not have been able to find a match (i.e., because "February" and "March" are not identical character stings). In this case, it should be taken into account that the date mismatch can occur for various reasons (e.g., an error in the database, an error in OCRing a document, etc.). In this situation, if it is known for sure that there is only one date on the document and only one date in the database, then it might not matter what the distance between the corresponding embeddings is, and the processing logic can determine that the pair of character strings are in fact a match.

In this example, if the full-text search method (i.e., word search 206) and the embedding search 208 are compared, then, in the case of a full-text search, the processing logic can arrive at the conclusion that there are no fields in in the text that match the particular entry (i.e., that it is not possible to generate a corresponding markup). However, if the processing logic utilizes the embedding search method 208, the processing logic may be able to determine a matching region in the document and generate the corresponding markup indicating the class of information contained in the corresponding region on the document. Therefore, the use of different matching methods can enhance the capabilities of the processing logic and improves the accuracy of the techniques described herein.

Another character string identification method that can be utilized in some implementations is receiving identifications of fields that correspond to respective record elements via a user interface. In some implementations, the processing logic can receive input from a user interface where the input indicates associations or correspondences between entries in the record and areas or fields on a document. Accordingly, the input received from the user interface can generate markup of documents. In some implementations the input field identifications received from the user interface can be used to mark up documents completely or partially (e.g., if the partial markup is sufficient for subsequent work, or if the partial markup has already been obtained previously and the document is being marked up further).

As noted previously, the various aforementioned character string identification methods can be used independently, sequentially, or in combination with each other to identify regions or fields in a document that correspond to respective entries in records in the database. Thus, in some of the implementations, having applied any combination of the four methods (i.e., at least one of them or any combination of them), the processing logic, as an output, generates a set of proposed correspondence associations (i.e., a set of correspondences, where each correspondence is characterized by a respective probability/measure). In some implementations this involves the processing logic determining, for each entry of the record, a corresponding degree of association between the entry and the respective item of information referenced by the entry. In some implementations, the processing logic can utilize additional means to calculate weights, probabilities, and/or scores associated with each of the proposed correspondence associations. An example diagram 500 of multiple proposed correspondence associations, each indicating how different fragments/fields 572A, 572B, 572C of a real document can correspond with different weights (i.e., indicators of a likelihood of correspondence) to one record element (i.e., entry) 562 in the database.

In some implementations, the processing logic can, at operation 214 further refine the proposed correspondence associations (e.g., by conducting an assessment of proposed correspondence associations based on mutual information, merging or dividing the proposed correspondence associations into groups, etc.). In some implementations, when different proposed correspondence associations have the same probabilities with respect to a particular region on the document, the processing logic can, at operation 214, recalculate their probabilities and, accordingly, increase or decrease the probability for some proposed correspondence associations. Accordingly, at operation 214 the processing logic can update, using a second character string identification method, the one or more proposed correspondence associations that were previously generated. As part of operation 214, the processing logic can update the one or more corresponding degrees of association between the entries of the record and the respective items of information (i.e., located on the document) that are referenced by the entries. In some implementations, updating the one or more proposed correspondence associations can include the processing logic eliminating corresponding degrees of association that are lower than a predefined threshold value. Consequently, this can also include the processing logic eliminating the proposed correspondence associations whose indicated degree of association is lower than a predefined threshold value. It can further include the processing logic combining degrees of association resulting from different character string identification methods. Accordingly, in some implementations, this can entail the processing logic combining proposed correspondence associations that were generated from different character string identification methods.

As described in more detail below, the processing logic can create a bipartite graph at operation 212 and determine, from the one or more proposed correspondence associations, the proposed correspondence associations that indicate a degree of association that satisfies a pre-determined criterion. The processing logic determining the proposed correspondence associations that indicate the degree of association that satisfies a criterion can include, at operation 213, the processing logic applying a bijective function to a set of entries from the record and a corresponding set of items of information identified in the document to determine optimal matches between them. In the several implementations, the processing logic applying a bijective function at operation 213 entails the processing logic selecting the set of corresponding degrees of association that satisfies the criterion.

Figure 5:
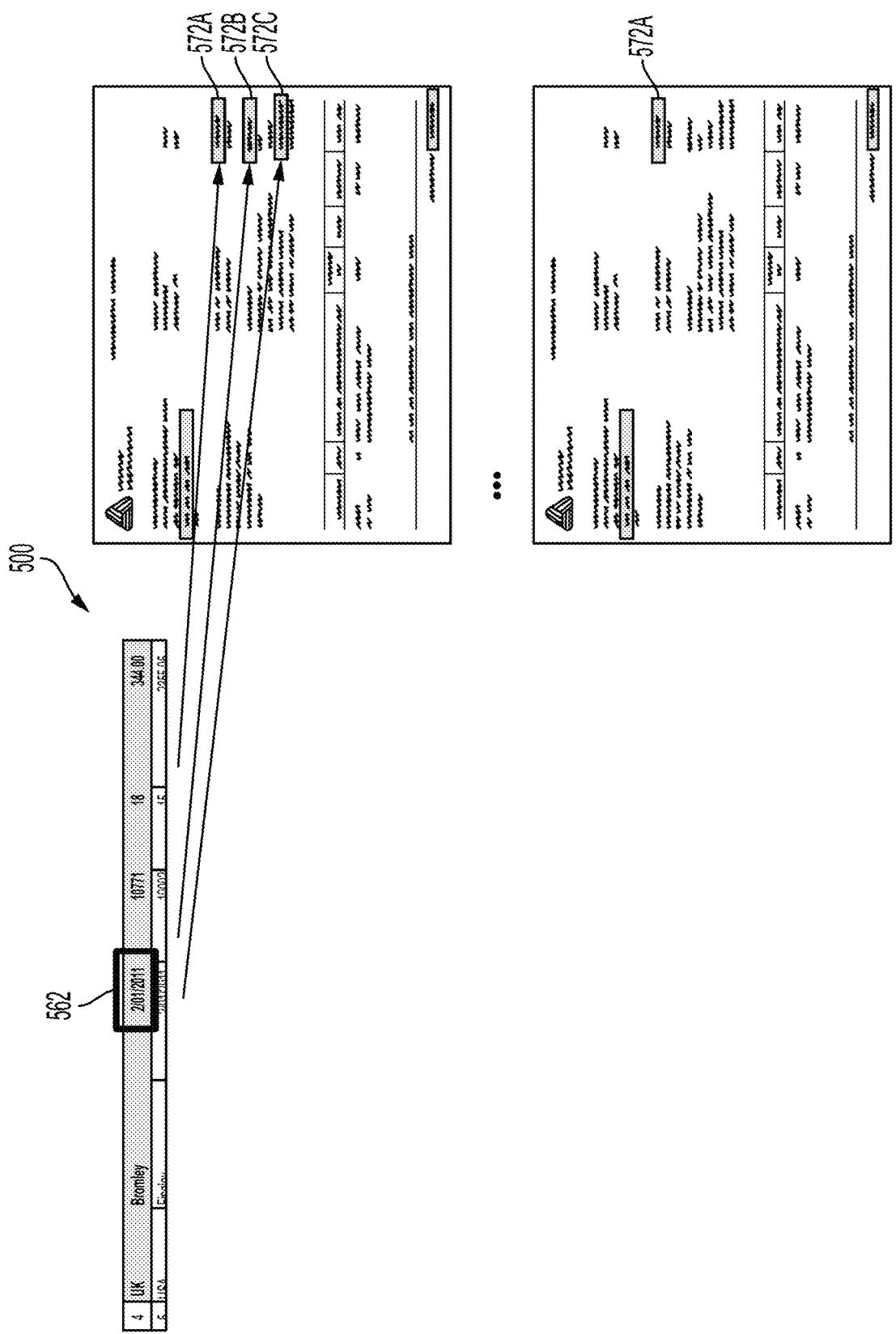
FIG. 5 illustrates several potential correspondences between an entry in the record and respective parts of a document, in accordance with some implementations of the present disclosure.

Thus, in some implementations having obtained a set of all possible proposed correspondence associations generated by using the various character string recognition mentioned earlier, the processing logic can generate a bipartite graph at operation 212. The graph can include areas or regions in the document as elements of one column and record elements/entries from the database as elements in another column. Then the processing logic can create associations or links (e.g., represented as lines, edges, arcs) between database entries and potentially corresponding region/fragments in the documents. Notably, in some implementations, the potential associations (e.g., represented by lines) can conflict/intersect with each other (e.g., one region on a document can be associated with several entries from the database and one field can be associated with several regions) as depicted in FIG. 5. Thus, in some implementations, the resulting bipartite graph can have a high density of potential association. Further, each connection linking an element in the first column with an element in the second column in the graph can have an associated measure of correspondence (i.e., measure of probability that the elements in fact correspond to each other).

In some implementations, after generating the bipartite graph, the processing logic can determine the optimal matching between corresponding elements (i.e., determine the proposed correspondence association with the maximal measure of correspondence). This determination can be achieved using some one of a variety of mathematical approaches including combinatorial optimization algorithms such as the Hungarian algorithm or stable solution algorithms to the Stable Marriage Problem. In essence, the purpose of the various algorithm that could be applied, is to find a consistent set of pairs (i.e., pairs of elements in each of the respective columns of the graph, where each pair represents a proposed correspondence associations between the elements in the pair along with a measure/estimate of the correspondence between them) with a maximum measure (i.e., maximal matching confidence measure) such that the final connections (e.g., arcs/links of the graph) do not intersect and the total estimate (e.g., sum of confidence weights) is maximal. Noncontradictory (i.e., consistent) combinations maximize the aggregate weight (i.e., confidence measures) of all the pairs of elements. By using one or more of the algorithms, all pair-combinations of the form "document region/field"–"information from the database" can be generated. For each such pair, the processing logic can calculate a measure of similarity of each potential combination (i.e., link) to determine how similar/dissimilar each of the elements in the pair are to each other. The calculation can be performed, in some implementations, by using a trained classifier (e.g., trained on gradient boosting) analogously to a trained proposed correspondence association classifier.

To clarify this process, consider an example where an entry from a database record cannot logically match both the "Address" and the "Date" fields on the document at the same time. Accordingly, the processing logic can utilize one or more algorithms to determine the most optimal matching for each respective field in the document, on the basis of which the automatic markup can be generated to serve as the training input on which the information extraction machine learning model can subsequently be trained.

Figure 6:
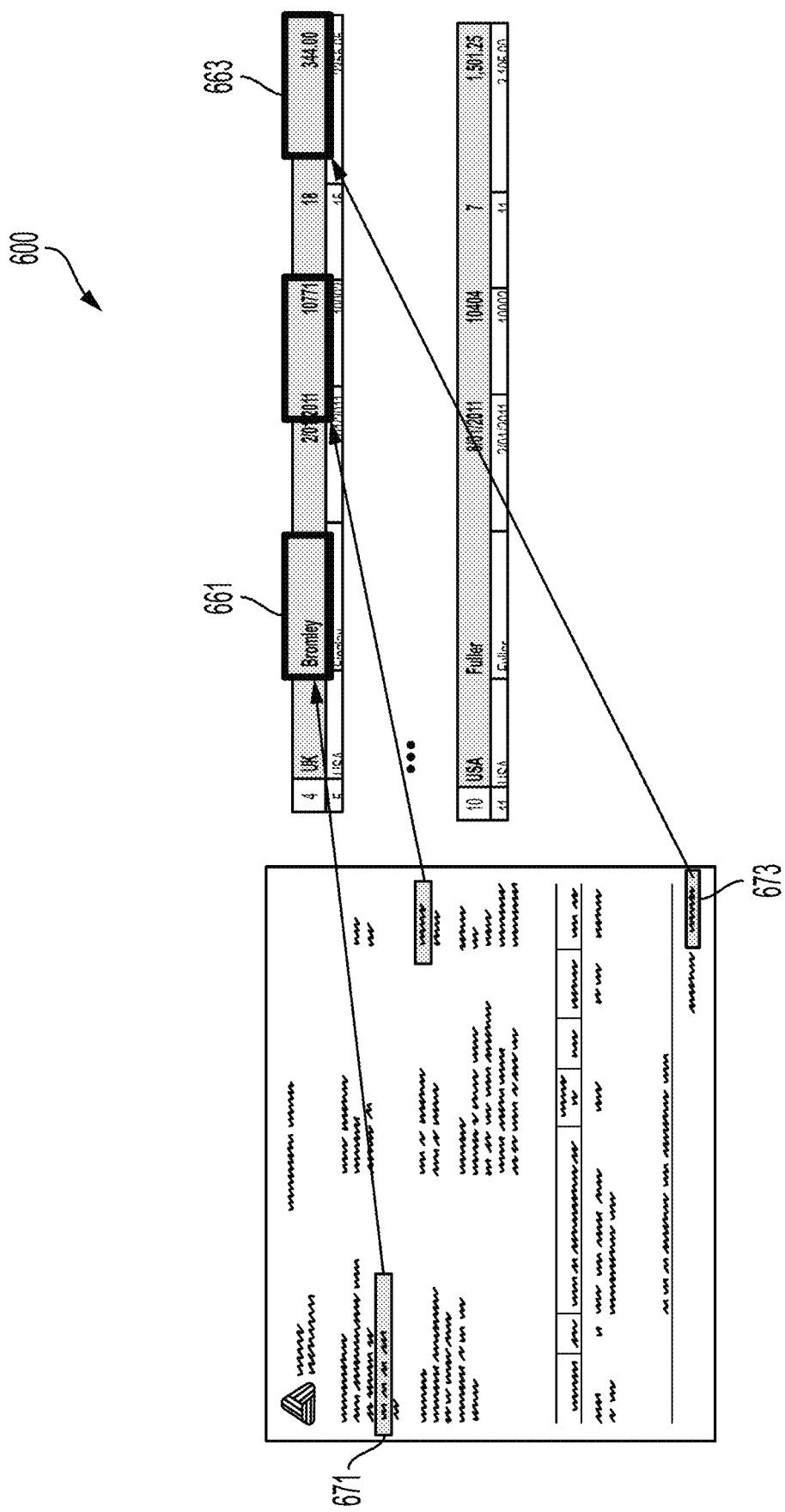
FIG. 6 illustrates several proposed correspondence associations between entries in the record and parts of a document, in accordance with some implementations of the present disclosure.

In some implementations, such as the one depicted in FIG. 6, a result 600 of determining an optimized set of proposed correspondence associations (i.e., an optimal matching) can include several proposed correspondence associations between entries 661, 663 in the record and parts/regions 671, 673 of a document, in accordance with some implementations of the present disclosure. For example, after executing a bijective function (e.g., using one of the aforementioned algorithms) from an initial set of 1000 connective edges between respective element, the processing logic can reduce the amount of connections to around 15-20 edges. Accordingly, these 15-20 edges can clearly indicate that a particular region/field of the document corresponds to the "date" entry in the record. Moreover, they can further indicate that no other entry from the database is associated with (i.e., corresponds to) this region in the document and that this region is also not associated with (i.e., does not correspond to) any other entry in the database. Note that there may be situations when document regions/fields are found that are not associated with any entries in the database (for example, if the database does not have such a column).

Consequently, in some implementations, some or all the entries in the database record can be associated, by the processing logic at operation 218, with a corresponding region on the document. The automatic markup (i.e., automatic indication of the information class and entry to which a particular region/field on a document corresponds to) generated at operation 218 by the processing logic can indicate the connections/associations can that represent the correspondences between respective entries and respective regions on the document. Accordingly, the processing logic can produce either a partial or a complete markup (e.g., if every entry in the database record is found as a field in the document). Furthermore, this this markup can be considered to be reflective of the most probable correspondences and therefore be most reliable in the context of automatic markup generation.

Thus, the processing logic can be trained or configured to identify (i.e., find, determine, detect) reliable and non-contradictory proposed correspondence associations between the fields of documents and the entries in the database such that the processing logic outputs: (i) a region/area of the document (e.g., as indicated by its coordinates); (ii) the character string or text value of a corresponding entry in a record of the database (i.e., which may have been normalized to appear in a different form or format); and (iii) an information class label for this region of the document (i.e., where the class label can be determined by the name of the corresponding entry in the database). In this manner, the processing logic can identify and automatically mark the set of final proposed correspondence associations between fields on a document and entries in the database. Thus, in some implementations, at operation 218, the processing logic can link content areas in the document with corresponding entries from the record, where the linking is based on the proposed correspondence associations. In some cases the processing logic linking content areas in the document with entries from the record can include associating data fields in the document with entries in the record.

In some implementations, according to the proposed correspondence associations obtained, the processing logic can automatically mark up new documents. In some cases using such automatic markup, a certain number of errors (e.g., 5-15%) can be permitted without affecting the overall reliability of the implementation since, for most documents, the markup will nevertheless be correct. In some cases, it can be possible to send the automatic markup received by the system for validation to a user interface (e.g., as in operation 122 of FIG. 1) in order to obtain a complete reliable markup. It should be noted that the automatic markup generated by the processing logic can be sufficient to train an information extraction model (e.g., a neural network model for extracting document fields) with reliable quality for a given type of document.

In some other implementations, the processing logic (i.e., or a system such as computing system 700 of FIG. 7 executing the processing logic) can be additionally configured to structure the word embeddings in such a way that their vector values will be identical in both in Array1 and Array2. This can be achieved by training vector representation models until the desired result is obtained. Further, the processing logic can generate embeddings not just for entire phrases, but also for fragments of phrases. For example, for each field, phrase fragments can be searched in the document after which the plausibility of the correspondence of those phrase fragments to a particular item of information can be assessed. In some implementations, the processing logic can determine whether these phrase fragments overlap with any of the elements in the selection of the training data used to train a classifier. Next, proposed correspondence associations for each field can be generated by the processing logic and the respective connections (i.e., correspondences/associations) can be evaluated (e.g., by using a search algorithm on a bipartite graph). In some implementations, the search can result in one or more plausible proposed correspondence associations. The processing logic can determine a confidence measure of the plausible proposed correspondence associations and compare it to a threshold of a likelihood value of 0.5, 0.6, or another suitable value.

Further, preliminarily conducting a model analysis (e.g., through the use of additional features in besides character strings/words such as pictures, separators, and other elements/objects of the document) and building a corresponding structure (i.e., physical or logical) for the document can additionally optimize the information extraction mechanism described herein (e.g., so that the processes operate faster). For example, the processing logic can define the header, footer, body of the document, etc. to clearly delineate areas of the document that can contain certain types of information. In some implementations for each area, the processing logic (e.g., via a GUI) can set up different criteria for searching or generating embeddings. For example, in a multi-page document with 10,000 items it can be known that the taxes are always shown on the last page. Accordingly, if the database has a column named "Taxes", then it is logical to indicate or set the search area for a field or region containing such information in the document as "the last and penultimate page of the document".

It should also be noted that the processing logic (i.e., or a system such as computing system 700 of FIG. 7 executing the processing logic) can be additionally configured to permit certain operating parameters to be set. For example, if a user of the system knows that addresses in company documents consist of a maximum of 10 words and the address is usually indicated in the header (i.e., at the top) of the document, or that there is definitely no address in the area of the document that contains tables, then the processing logic (e.g., via the system GUI) can permit criteria such as "maximum number of words for embeddings" or "search area/document fragment", "document areas for which embeddings should not be built", etc. to be set. Such settings can reduce the system computing resources and work time utilized when performing the operations disclosed herein.

Moreover, it is important to note that a user can either set various parameters to optimize the work, or require the processing logic (i.e., or a system such as computing system 700 of FIG. 7 executing the processing logic) to independently learn (e.g., from previously processed documents) the distribution of fields on the pages statistically. For example, the processing logic can automatically identify in which particular areas of the document respective record elements/entries from the database in can most often be located. Furthermore, in some implementations, the processing logic can select, for example, the top 3 or 5 proposed correspondence associations with the highest score for each element of the database record.

Accordingly, in the various embodiments, the processing logic can train the information extraction model on the fly, thereby improving the quality of the extraction. The model can be trained either at predetermined time intervals, in some implementations, or, in other implementations at a frequency that depends on the number of documents being processed. In other implementations the training can occur upon receipt of a specific input from a system user, or upon the occurrence of another triggering even. Further, in some implementations, the processing logic can retrain/restructure embeddings, an in the process discard incorrect ones. Suppose that at first it is possible to generate matches using 100 documents and to then then retrain the model using another set of 100 documents, thereby retraining/reimplementing the automatic markup and improving its quality. When a certain measure of quality is reached (e.g., a level of quality that is preset or detected by the system), the system can deem the resulting automatic labeling to be reliable/valid.

As mentioned earlier, in some implementations, the user can participate as a validator of markup to determine whether it is valid or not. For example, a user can be given several random documents with automatic markup which the user can either reject or confirm the validity of. In the event that the user subsequently desires to enter into the database information from new documents with extended (i.e., additional) information contained in, for example, new record elements that were not previously present in database, then the composition of the entries/record elements and the corresponding column labels in the old/existing database can be expanded to encompass the new types/classes of information. In such cases, since there was no markup of documents for these new fields and the models utilized by the processing logic did not learn how to identify or extract information from such fields, in some implementations input from a user interface can be used to mark up a certain number of documents (e.g., 3-5-10 documents or another amount) to facilitate the subsequent effective markup and training.

For example, consider a situation where there was no information about a vendor in the database. Such information may have never been collected before or entered in to the records of the database, but now a need to enter information about the vendor into the database has arisen. After marking several documents, additional training of the model can be initiated by the processing logic, that includes training for the identification of this new field, "Vendor". Accordingly, the "Vendor" column can be added to the database (e.g., by the client creating it in the database, by creating it directly in the system, or by the processing logic automatically generating it in the system). In some implementations, the retrained model can be executed on all the documents in the collection of documents to fill/populate the values of the entries corresponding to this element of a record in the database for all historical documents. Consequently, the entries in the database that correspond to this field in the documents can be filled for all historical documents. Furthermore, the model can be trained again on the full set of client documents to improve the quality of the model. Consequently, the resulting model can enable the automated entry of information, including entries of values of the "Vendor" field, into the database from new documents with a high level of quality.

Figure 7:
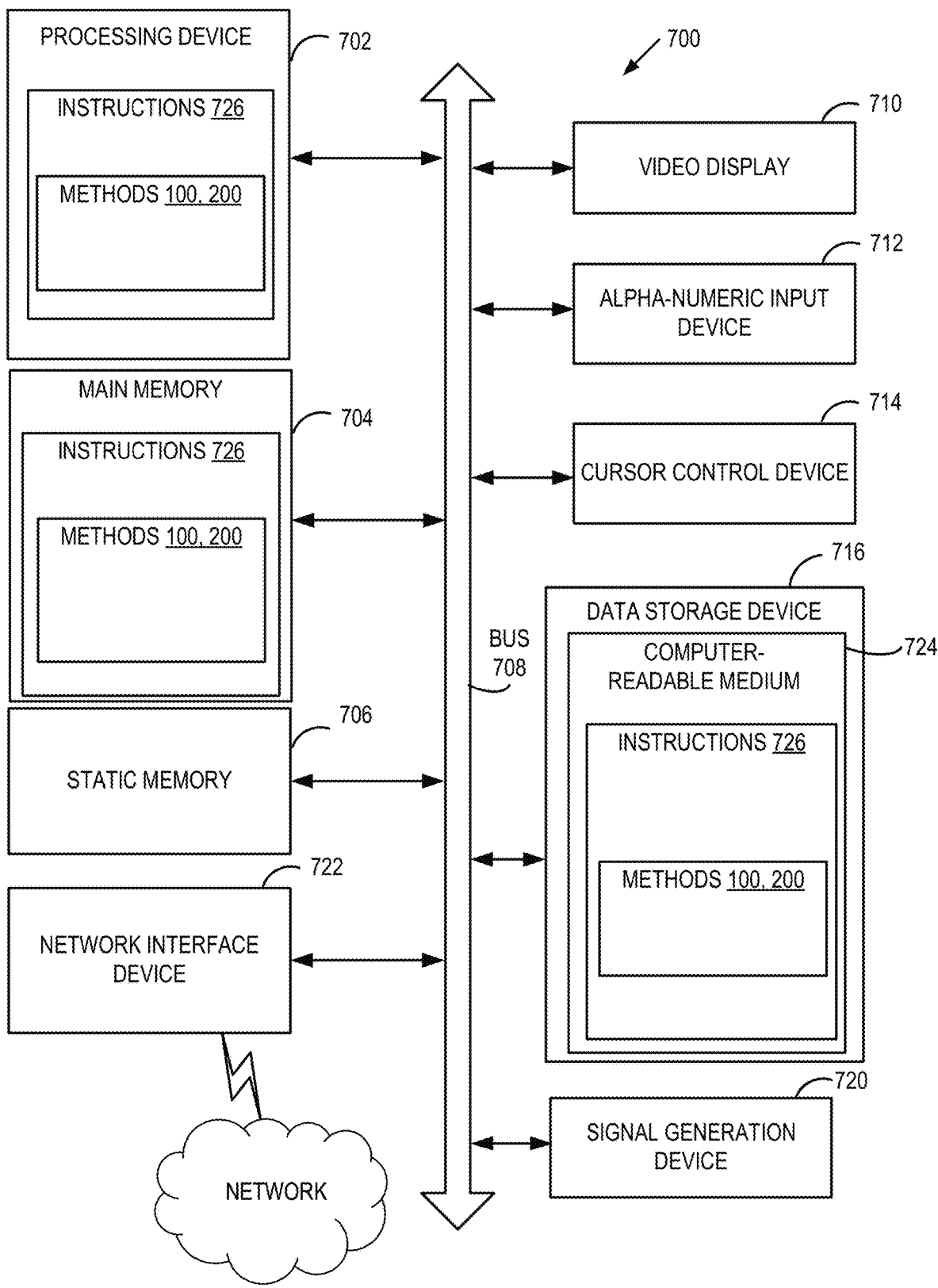
FIG. 7 illustrates a block diagram of a computer system in accordance with some implementations of the present disclosure.

FIG. 7 depicts an example computer system 700 which can perform any one or more of the methods described herein. The computer system may be connected (e.g., networked) to other computer systems in a LAN, an intranet, an extranet, or the Internet. The computer system may operate in the capacity of a server in a client-server network environment. The computer system may be a personal computer (PC), a tablet computer, a set-top box (STB), a Personal Digital Assistant (PDA), a mobile phone, a camera, a video camera, or any device capable of executing a set of instructions (sequential or otherwise) that specify actions to be taken by that device. Further, while only a single computer system is illustrated, the term "computer" shall also be taken to include any collection of computers that individually or jointly execute a set (or multiple sets) of instructions to perform any one or more of the methods discussed herein.

The exemplary computer system 700 includes a processing device 702, a main memory 704 (e.g., read-only memory (ROM), flash memory, dynamic random access memory (DRAM) such as synchronous DRAM (SDRAM)), a static memory 706 (e.g., flash memory, static random access memory (SRAM)), and a data storage device 716, which communicate with each other via a bus 708.

Processing device 702 represents one or more general-purpose processing devices such as a microprocessor, central processing unit, or the like. More particularly, the processing device 702 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 702 may also be one or more special-purpose processing devices such as an application specific integrated circuit (ASIC), a field programmable gate array (FPGA), a digital signal processor (DSP), network processor, or the like. The processing device 702 is configured to execute instructions 726 for implementing the methods disclosed herein, such as the method 100 and/or the method 200 of FIGS. 1 and 2 respectively, and to perform the all of the operations performed by the processing logic described herein (e.g., operations of methods 100 and 200 of FIGS. 1 and 2 respectively).

The computer system 700 may further include a network interface device 722. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 720 (e.g., a speaker). In one illustrative example, the video display unit 710, the alphanumeric input device 712, and the cursor control device 714 may be combined into a single component or device (e.g., an LCD touch screen).

The data storage device 716 may include a computer-readable medium 724 on which is stored the instructions 726 embodying any one or more of the methodologies or functions described herein. The instructions 726 may also reside, completely or at least partially, within the main memory 704 and/or within the processing device 702 during execution thereof by the computer system 700, the main memory 704 and the processing device 702 also constituting computer-readable media. In some implementations, the instructions 726 may further be transmitted or received over a network via the network interface device 722.

While the computer-readable storage medium 724 is shown in the illustrative examples to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

Although the operations of the methods herein are shown and described in a particular order, the order of the operations of each method may be altered so that certain operations may be performed in an inverse order or so that certain operation may be performed, at least in part, concurrently with other operations. In certain implementations, instructions or sub-operations of distinct operations may be in an intermittent and/or alternating manner.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

In the above description, numerous details are set forth. It will be apparent, however, to one skilled in the art, that the aspects of the present disclosure may be practiced without these specific details. In some instances, well-known structures and devices are shown in block diagram form, rather than in detail, in order to avoid obscuring the present disclosure.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving," "determining," "selecting," "storing," "analyzing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer-readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description. In addition, aspects of the present disclosure are not described with reference to any particular programming language. It will be appreciated that a variety of programming languages may be used to implement the teachings of the present disclosure as described herein.

Aspects of the present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read-only memory ("ROM"), random access memory ("RAM"), magnetic disk storage media, optical storage media, flash memory devices, etc.).

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "of" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" or "an implementation" or "one implementation" throughout is not intended to mean the same implementation or implementation unless described as such. Furthermore, the terms "first," "second," "third," "fourth," etc. as used herein are meant as labels to distinguish among different elements and may not necessarily have an ordinal meaning according to their numerical designation.

Whereas many alterations and modifications of the disclosure will no doubt become apparent to a person of ordinary skill in the art after having read the foregoing description, it is to be understood that any particular implementation shown and described by way of illustration is in no way intended to be considered limiting. Therefore, references to details of various implementations are not intended to limit the scope of the claims, which in themselves recite only those features regarded as the disclosure.

What is claimed is:

1. A method comprising:
   receiving, by a processing device, a document;
   identifying, in a data structure, a record corresponding to the document, the record comprising one or more entries, each entry containing data reflecting a respective item of information extracted from a corresponding part of the document;
   for each entry of the record, determining a first embedding of a first character string contained by the entry;
   identifying, among a set of embeddings corresponding to character strings of the document, a second embedding that is closest in a vector space to the first embedding;

identifying, in the document, a second character string encoded by the second embedding;

determining a degree of association between the entry and the second character string;

selecting, among a plurality of degrees of association between entries of the data structure and corresponding character strings, a set of degrees of association whose aggregate degree of association satisfies a criterion; and training, using the set of degrees of association, a machine learning model to extract information from new documents.

2. The method of claim 1, further comprising:

updating the degree of association by performing at least one of:

identifying character strings using a word search, detecting fields with a neural network model, or receiving identification of character strings from a user interface.

3. The method of claim 2, wherein the word search comprises: searching a body of text in the document for a character string from the entry of the record by performing one or more of an exact string search, a prefix search, an approximate string search, or an approximate prefix search.

4. The method of claim 2, wherein detecting the fields with the neural network model comprises: marking one or more areas in a document as fields, each field associated with a class of information, and matching a character string from the entry in the record with one or more fields based on the class of information associated with each field.

5. The method of claim 1, further comprising performing at least one of:

eliminating degrees of association that are lower than a predefined threshold value or combining degrees of association resulting from different character string identification methods.

6. The method of claim 1, wherein selecting the set of degrees of association that satisfies a criterion comprises: applying a bijective function to a set of entries from the record and a set of items of information identified in the document.

7. A system comprising:

a memory device comprising a data structure;

a processor coupled to the memory device, the processor configured to perform operations comprising:

receiving a document;

identifying, in a data structure, a record corresponding to the document, the record comprising one or more entries, each entry containing data reflecting a respective item of information extracted from a corresponding part of the document;

for each entry of the record, determining a first embedding of a first character string contained by the entry;

identifying, among a set of embeddings corresponding to character strings of the document, a second embedding that is closest in a vector space to the first embedding;

identifying, in the document, a second character string encoded by the second embedding;

determining a degree of association between the entry and the second character string;

selecting, among a plurality of degrees of association between entries of the data structure and corresponding character strings, a set of degrees of association whose aggregate degree of association satisfies a criterion; and training, using the set of degrees of association, a machine learning model to extract information from new documents.

8. The system of claim 7, wherein the operations further comprise:

updating the degree of association by performing at least one of:

identifying character strings using a word search, detecting fields with a neural network model, or receiving identification of character strings from a user interface.

9. The system of claim 8, wherein the word search comprises: searching a body of text in the document for a character string from the entry from the record by performing one or more of an exact string search, a prefix search, an approximate string search, or an approximate prefix search.

10. The system of claim 8, wherein detecting the fields with the neural network model comprises: marking one or more areas in a document as fields, each field associated with a class of information, and matching a character string from the entry in the record with one or more fields based on the class of information associated with each field.

11. The system of claim 7, wherein the operations further comprise:

performing at least one of: eliminating corresponding degrees of association that are lower than a predefined threshold value or combining degrees of association resulting from different character string identification methods.

12. The system of claim 7, wherein selecting the set of degrees of association that satisfies a criterion comprises: applying a bijective function to a set of entries from the record and a set of items of information identified in the document.

* * * * *